US009286098B1

(12) United States Patent  
Baimetov et al.

(10) Patent No.: US 9,286,098 B1
(45) Date of Patent: *Mar. 15, 2016

(54) USING MASTER FILE TEMPLATE AREA TO INCREASE DENSITY OF VIRTUAL MACHINES IN A COMPUTER SYSTEM

(71) Applicant: Parallels IP Holdings GmbH, Schaffhausen (CH)

(72) Inventors: Ilya Baimetov, Seattle, WA (US); Nikolay N. Dobrovolskiy, Moscow (RU); Alexander G. Tormasov, Moscow (RU); Serguei M. Beloussov, Singapore (SG)

(73) Assignee: Parallels IP Holdings GmbH, Schauffhausen (CH)

( * ) Notice: Subject to any disclaimer, the term of this patent is extended or adjusted under 35 U.S.C. 154(b) by 170 days.

This patent is subject to a terminal disclaimer.

(21) Appl. No.: 14/172,630

(22) Filed: Feb. 4, 2014

Related U.S. Application Data

(63) Continuation of application No. 12/048,046, filed on Mar. 13, 2008, now Pat. No. 8,656,386.

(60) Provisional application No. 60/979,104, filed on Oct. 11, 2007, provisional application No. 60/894,465, filed on Mar. 13, 2007.

(51) Int. Cl.
*G06F 9/445* (2006.01)
*G06F 9/455* (2006.01)

(52) U.S. Cl.
CPC .................. *G06F 9/45533* (2013.01)

(58) Field of Classification Search
CPC .......... G06F 9/45533; G06F 9/45562
USPC ........ 1/1; 717/168; 711/147; 718/1; 709/201, 709/226, 223, 220
See application file for complete search history.

(56) References Cited

U.S. PATENT DOCUMENTS

| 5,313,646 | A  |   | 5/1994  | Hendricks et al. |
|-----------|----|---|---------|-------------------|
| 6,571,245 | B2 | * | 5/2003  | Huang ............. G06F 17/30867 |
| 6,618,736 | B1 |   | 9/2003  | Menage            |
| 6,738,977 | B1 | * | 5/2004  | Berry .................. G06F 9/44563 718/1 |
| 6,859,812 | B1 | * | 2/2005  | Poynor ............. G06F 17/30067 |
| 7,356,679 | B1 | * | 4/2008  | Le ..................... G06F 17/30067 707/E17.01 |
| 7,469,323 | B1 |   | 12/2008 | Tormasov et al.   |
| 7,584,228 | B1 |   | 9/2009  | Protassov et al.  |
| 7,698,400 | B1 |   | 4/2010  | Beloussov et al.  |
| 7,890,605 | B1 | * | 2/2011  | Protassov ............. G06F 9/5055 709/201 |
| 8,060,703 | B1 |   | 11/2011 | Desai et al.      |
| 8,209,498 | B2 |   | 6/2012  | Takata et al.     |
| 8,286,174 | B1 | * | 10/2012 | Schmidt ................ G06F 9/5077 709/226 |

(Continued)

*Primary Examiner* — Thomas Lee
*Assistant Examiner* — Aurel Prifti
(74) *Attorney, Agent, or Firm* — Bardmesser Law Group

(57) ABSTRACT

A system, method and computer program product for managing files of Virtual Machines, including launching a plurality of Virtual Machines in a computing system having a host OS. Content of at least one file of the host OS is used as a shared file. Using a re-direct, access is provided to the shared file when any Virtual Machine attempts to access its private file; using copy-on-write, a copy is made of the shared file if the Virtual Machine attempts to modify the shared file, and placed in a private area of the corresponding Virtual Machine. One of the Virtual Machines is used as master template, and includes shareable files to which attempts to access the file by other Virtual Machines are redirected. Access to the shared file from the Virtual Machine is implemented using stub files.

25 Claims, 12 Drawing Sheets

(56) References Cited

U.S. PATENT DOCUMENTS

| | | | |
|---|---|---|---|
| 8,296,759 B1* | 10/2012 | Hutchins | G06F 9/45558 709/223 |
| 8,577,940 B2 | 11/2013 | Tormasov et al. | |
| 2002/0143906 A1* | 10/2002 | Tormasov | G06F 17/30067 709/220 |
| 2005/0229175 A1 | 10/2005 | McCrory et al. | |
| 2005/0283575 A1* | 12/2005 | Kobayashi | G06F 3/0604 711/147 |
| 2005/0283585 A1 | 12/2005 | Sexton et al. | |
| 2006/0089950 A1* | 4/2006 | Tormasov | G06F 17/30067 |
| 2006/0218544 A1* | 9/2006 | Chakraborty | G06F 8/63 717/168 |
| 2007/0074208 A1* | 3/2007 | Ling | G06F 9/45558 718/1 |
| 2007/0162521 A1* | 7/2007 | Raghunath | G06F 9/44563 |
| 2007/0239712 A1 | 10/2007 | Chen et al. | |
| 2007/0260831 A1 | 11/2007 | Michael et al. | |
| 2008/0155536 A1* | 6/2008 | Levit-Gurevich | G06F 9/4843 718/1 |
| 2011/0088036 A1 | 4/2011 | Patanella | |

* cited by examiner

USING MASTER FILE TEMPLATE AREA TO INCREASE DENSITY OF VIRTUAL MACHINES IN A COMPUTER SYSTEM

CROSS-REFERENCE TO RELATED APPLICATIONS

This application is continuation of U.S. patent application Ser. No. 12/048,046, filed on Mar. 13, 2008, which is a non-provisional of U.S. Provisional Patent Application No. 60/979,104, filed on 11 Oct. 2007, and is a non-provisional of U.S. Provisional Patent Application No. 60/894,465, filed on 13 Mar. 2007, which are both incorporated herein by reference.

BACKGROUND OF THE INVENTION

1. Field of the Invention

This invention relates to system virtualization, and, more particularly, to Virtual Machine technology.

2. Description of the Related Art

One of the current issues in Virtual Machine implementation is management of relatively scarce physical resources, given a fairly large footprint of each Virtual Machine. For example, situations where a Virtual Machine is used as a webserver are common, as well as where multiple such Virtual Machines are running on the same physical computer. As such, the footprint of each Virtual Machine, particularly as it affects memory and disk space, becomes of particular concern. As a practical matter, many modern operating systems require several gigabytes of disk space (and sometimes a comparable amount of disk space allocated to user applications), as well as several megabytes of physical memory that needs to be allocated to each Virtual Machine, to account for the guest operating system as well as the user applications running inside each Virtual Machine.

A method for sharing memory pages is described in U.S. Pat. No. 6,789,156 to Waldspurger, filed Sep. 7, 2004 for content-based, transparent sharing of memory units, where only a part of memory space may be handled using a number of checking procedures.

In sum, there is a need to decrease the amount of scarce resources consumed by each Virtual Machine, in order to be able to increase the density of Virtual Machines on each physical system.

SUMMARY OF THE INVENTION

Accordingly, the present invention is related to a lightweight Virtual Machine or Virtual Execution Environment and to increasing density of Virtual Machines in a computer system that substantially obviates one or more of the disadvantages of the related art.

A system and method for managing files of Virtual Machines, including launching a plurality of Virtual Machines in a computing system having a host OS; using a content of at least one file of the host OS as a shared file; using a re-direct, providing access to the shared file when any Virtual Machine attempts to access its private file; using copy-on-write, making a copy of the shared file if the Virtual Machine attempts to modify the shared file, and placing a copy of the shared file in a private area of the corresponding Virtual Machine. Providing access to the file copy in the shared space uses an API redirection. The API redirection is performed on a file basis, or on a block basis. T The launching is performed from a VM image that does not include an OS distributive, and/or a boot-only disk partition.

The templates for VM use are located in a separate storage area of the disk. The boot data is located at a predefined absolute address. The Virtual Machines are launched with full featured guest OSes, and the footprint of the guest OSes is then reduced by eliminating unnecessary files and replacing at least some of the remaining files with redirection links. The remaining files for replacement with the redirection links are identified by comparing guest OS files with host OS files. The remaining files for replacement with the redirection links are identified by comparing guest OS directories with host OS directories.

Linear memory address spaces of at least two Virtual Machines are overlapped. The guest OS of the Virtual Machines does not contain standard games supplies with the OS. The temporary files folder of the Virtual is redirected to the temporary files folder of the OS. The hiberfile.sys file of the Virtual Machines is removed from the image of the VM from which the VMs are launched. Driver files of the Virtual Machines are removed from the image of the VM, and redirects to host OS drivers are added. Virtual disk drives of the Virtual Machines are compacted.

One of the Virtual Machines is used as master template, and includes shareable OS files to which attempts to access the file by other Virtual Machines are redirected. One of the Virtual Machines is used as master template, and includes shareable user application files to which attempts to access the file by other Virtual Machines are redirected.

Providing access to the file copy in the shared space uses at least one of (a) network access to a file system in a shared area; (b) file redirection using a cluster file system and direct access to emulated raw disk partition that is created as a file or disk); (c) redirection using shared bus access initiated via VMM or Hypervisor; (d) shared memory area; and (e) network transport using at least one of TCP, UDP, Named Pipe, Local Unix Domain Sockets, SMB redirection and NFS. Access to the shared file from the Virtual Machine is implemented using stub files. The shared file is read-only.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
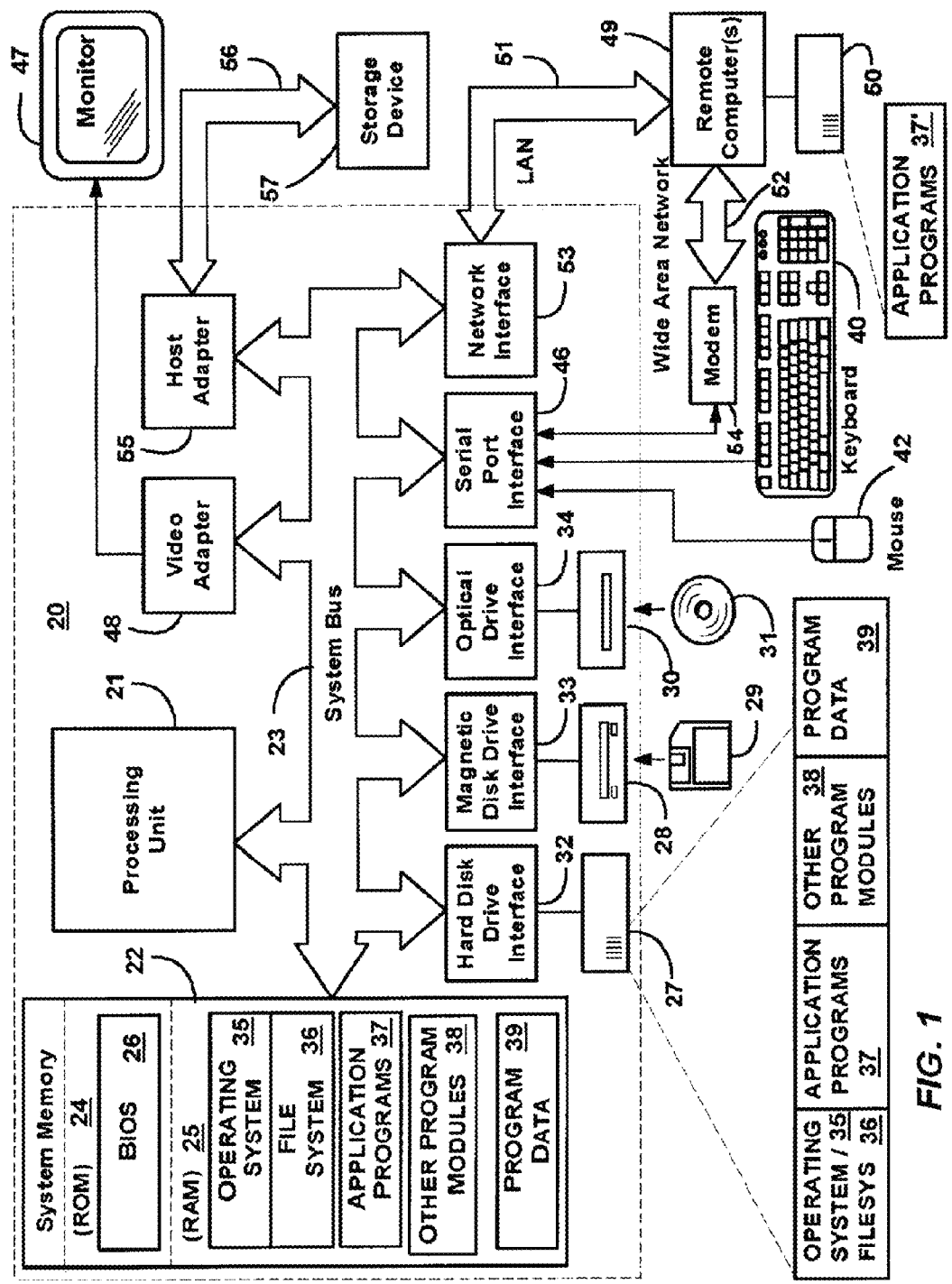
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention is described herein with reference to Microsoft Windows Operating Systems family (Windows XP, Windows 2003 Server, Windows Vista and also Windows 2000), formerly Windows NT™), and in particular to the Windows NT™ file system (NTFS). Notwithstanding this, there is no intention to limit the present invention to Windows 2000™, Windows NT™ or NTFS, but on the contrary, the present invention is intended to operate with and provide benefits with any operating system, architecture and/or file system.

Thus, a typical application includes a physical computing system or stand-alone computer (usually called a "host") that is configured to run multiple isolated Virtual Machines. The host includes an operating system (host OS) kernel. The kernel runs a number of processes and threads for execution of various system-related activities. The host OS also includes a number of processes running on the hardware server that correspond to the Virtual Machines. Various supporting mechanisms, such as Virtual Machine Monitor(s) and/or a Hypervisor (see, e.g., U.S. patent application Ser. No. 11/348,382, filed Feb. 7, 2006, entitled SYSTEM AND METHOD FOR STARTING VIRTUAL MACHINE MONITOR IN COMMON WITH ALREADY INSTALLED OPERATING SYSTEM, which is incorporated herein by reference in its entirety, are also provided.

The host can include a physical memory, such as a dynamic random access memory (RAM) used by the various processes and threads. The hardware system can also include various storage elements, such as caches, and operating system buffers. The computer system also includes a central processing unit (CPU), or optionally multiple CPUs, whose time can be shared between and among the Virtual Machines. A number of peripheral devices can be included, such as disk storage devices, input/output interfaces, network interfaces, etc. The storage mechanisms, particularly disk storage, can include data files, databases, metadata storage and various other permanently and temporarily stored data objects.

Generally, as used in this description, the operating system kernel has one or more "processes" running within the kernel mode. The host OS has its own objects for its own internal use, as well as a number of objects that are representative of the Virtual Machines supported on the physical computer 20.

Each Virtual Machine can use a set of operating system processes and applications running in user mode or in the privilege level lowest then operating system to support context of the VM and having support from the operating system kernel to provide a basis for VM support means. Each Virtual Machine typically has a number of processes and threads that correspond to, for example, application software (e.g., web-server, game server, word processing application server, non-native applications, etc.) being run by a particular VM user inside an emulated computer.

It should be noted that in the general case, Virtual Machine processes are fully isolated from each other, and one VM cannot affect another Virtual Machine's process, although in some cases, a single Virtual Machine can support other Virtual Machines within it. Also, the level of isolation between Virtual Machines can be reduced by the host OS or by additional settings.

Each Virtual Machine offers a number of services to users of that Virtual Machine, which are implemented as processes within that Virtual Machine.

One particular case that is frequently encountered in Virtual Machine applications is a situation where multiple Virtual Machines are running the same guest operating system, and substantially the same application software. Another special case is where the guest operating system in the Virtual Machine(s) is the same as the host operating system. Another special case is where, despite having numerous Virtual Machines running on the same computer, the number of different operating systems (in this context, a different version of an operating system may be viewed as a different operating system) is relatively small—only one or two, for example, with all the Virtual Machines running one or two versions of Linux, or all the Virtual Machines are running one or two different versions of Microsoft Windows™. The knowledge of which version of the OS is running in a VM can be obtained by the virtualization layer (e.g., VMM or Hypervisor) from the user (for example, when he instantiates the VM and installs the OS, he can be asked to enter the version number), or from the boot sector (of a real or virtual disk of the VM) that corresponds to the guest OS (e.g., by parsing the boot sector and identifying the version—for most OS's, the version number will be found at a specific location in the boot sector). As such, it is possible to increase the density of the Virtual Machines by reducing the footprint allocated to each Virtual Machine, due to the commonality of executable code and files across different Virtual Machines.

First, addressing the disk space issue, as noted earlier, the full image of an operating system, such as Microsoft Windows NT™, or Windows 2000™, or Windows Vista™, is on the order of several gigabytes. Normally, each Virtual Machine would have its own disk partition (a virtual disk drive, which is commonly mapped to the real disk drive using a file that represents the virtual disk drive). For two or more Virtual Machines running the same guest operating system, the absolute majority of the files are identical (the exceptions are generally related to a few configuration files and to installed applications, as well as to situations where the user deliberately modifies the files of the guest operating system—however, such attempts by the user are relatively rare in practice, and, optionally, may be forbidden altogether).

Thus, in this case, one of the Virtual Machines, instead of having a full image of the operating system, can rely on redirects to the other Virtual Machines' files, using, for example, links instead of files themselves and an API redirection module. To the Virtual Machine, this is transparent, so long as a copy-on-write (COW) scheme is implemented to ensure that should the user of one Virtual Machine attempt to actually modify a file that is present only as a link (for redirection purposes), the link is replaced by the actual file, for example, in the VM's private file area. As in one embodiment, a private file area for each such Virtual Machine can be created, to store guest operating system files that have been modified. The private area may be formed on the same storage media, from which Virtual Machine was initially started.

In this context, where multiple Virtual Machines are running the same guest operating system, one Virtual Machine can be treated as a master template, and contain "template files" for the guest OS files. In the case of a Virtual Machine that is used as a master template, such files should be protected from being modified or overwritten.

As yet another option, where the guest operating system is the same as the host operating system, the links that replace the files in the guest operating systems can point to the host operating system files instead.

One of the preferred embodiments involves a situation when all system files in the VM are taken from another VM or from the host system, and therefore the VM image does not contain files from the OS distributive. This significantly reduces the size of the VM image and allows its easy distribution via network and over portable media, e.g., flash drives, mobile phones, iPods and other media players, portable HDD, and so on.

It will also be appreciated that in this scenario, the redirect can be based either on a file basis, or based on a lower addressing unit—such as block or sector of the disk drive. It should also be remembered that in the case where sector-based or disk block-based redirects are used, this needs to be taken into account for Virtual Machine migration purposes, and appropriate address translation (where the addresses that are specified are actual physical addresses on the disk) needs to be implemented as well. Different hardware boxes can have different addresses of shared files and this can be addressed, for example, by updating of reference addresses or the file ID.

In addition to operating system files, it is also possible to apply this scheme to user applications. Here, there are two types of user applications that can be considered. The first type is "standard user applications," such as those supplied with installation of the Windows™ operating system (for example, Notepad.exe, games, such as Solitaire, Calculator, Windows™ Picture and Fax Viewer, etc.). In this case, the same redirect scheme can be applied to these applications, as with operating system files.

A second type of application that can be considered is a "true" user application, however, one that is replicated across multiple Virtual Machines—for example, Apache webserver application, running in several different Virtual Machines, and essentially behaving identically for the various Virtual Machines and their users. In this case, the executable code (though obviously not necessarily the user data for each web server) can be replaced by a link that redirects to a file in the master template Virtual Machine (or host operating system).

Another physical resource of the computer that limits the density of Virtual Machines is memory. One area where savings can be achieved is in pooling of free space of the various guest operating systems. Specifically, when guest operating system code is loaded into memory, there are typically empty, or free, pages in memory that are allocated by each guest operating system. Often, such free pages are part of a larger segment allocated to a particular portion of the operating system that is loaded into memory.

Figure 7:
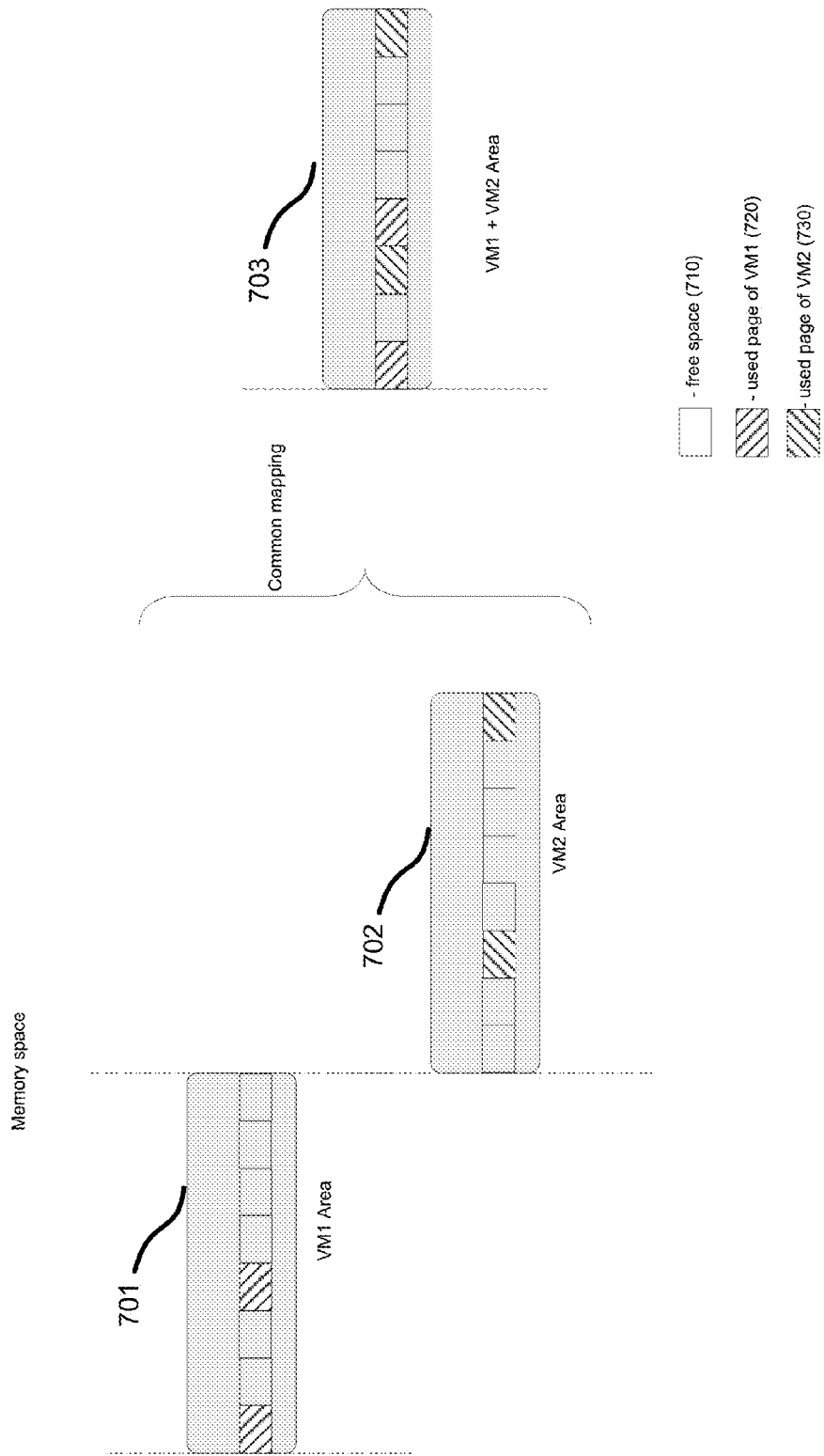
FIG. 7 illustrates sharing memory area where pages of different VM can be handled in a common addressable space.

FIG. 7 illustrates sharing of a memory area where pages of different VMs can be handled in a common addressable space. Since memory space is granulated into pieces with predefined minimal amount, for any piece of data could not be allocated less that the amount of memory space, the following approach is used. FIG. 7 shows memory single memory pages 701 and 702 of different VMs containing actual data 720 and 730 and free space 710. As can be seen, the total amount of used space of two VMs is less then page size, so linear memory spaces may be overlapped to reduce effect of memory granulation. FIG. 7 shows that used pages of VM1 and VM2 areas are stored in a common memory space 703 that significantly improves memory utilization. From the point of view of each VM, used space of other VMs in common memory area is not considered as a free space.

Figure 8A:
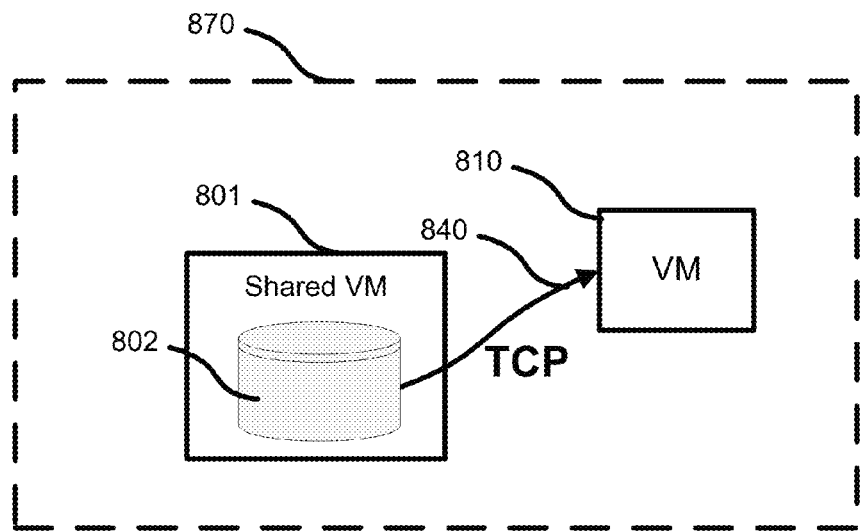
FIG. 8A-8D illustrates examples of delivery of content of shared files.
Figure 8B:
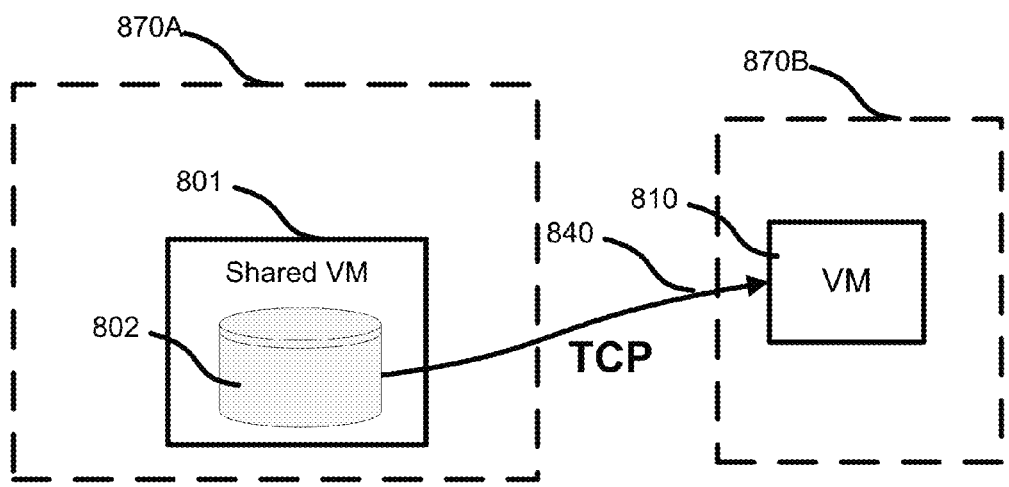

FIGS. 8A-8D illustrates examples of delivery content of shared files. Here, VM 801 represents a VM or host system where other VM(s) 810 can retrieve content of files that should be used locally by VMs 810. The content may be stored on the storage device 802 directly accessed by the VM 801. It should be noted that the VM 801 may be either dedicated VM or even, in some cases, the host system, or any VM 810 may be used as a source of shared files or data. Also, VM 801 and VM 810 may be installed either on a single local hardware system 870 (FIGS. 8A, 8C and 8D) or remote hardware systems 870A-870B (FIG. 8B).

As it shown in FIG. 8A-8B, network transport 840 is used for providing access to the file copy in the shared space. The network transport may be implemented using protocols such as, e.g., TCP, UDP, Named Pipe, Local Unix Domain Sockets, SMB redirection, NFS support means, and so on. Where the VMs 801 and 810 are connected via network protocol and installed on the same hardware system 870, virtual network adapters may be provided in the system, or other means for network packet delivery may be used.

Figure 8C:
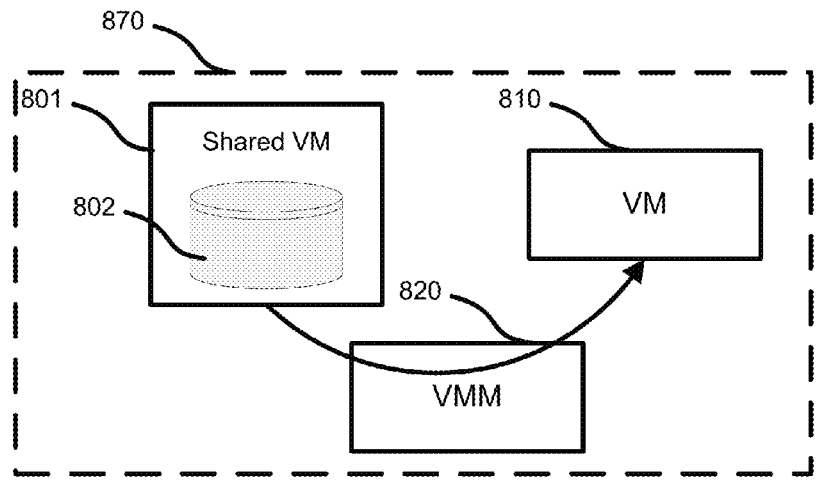

FIG. 8C shows an embodiment where VMM 820 or a Hypervisor controls transfer of shared files data.

Figure 8D:
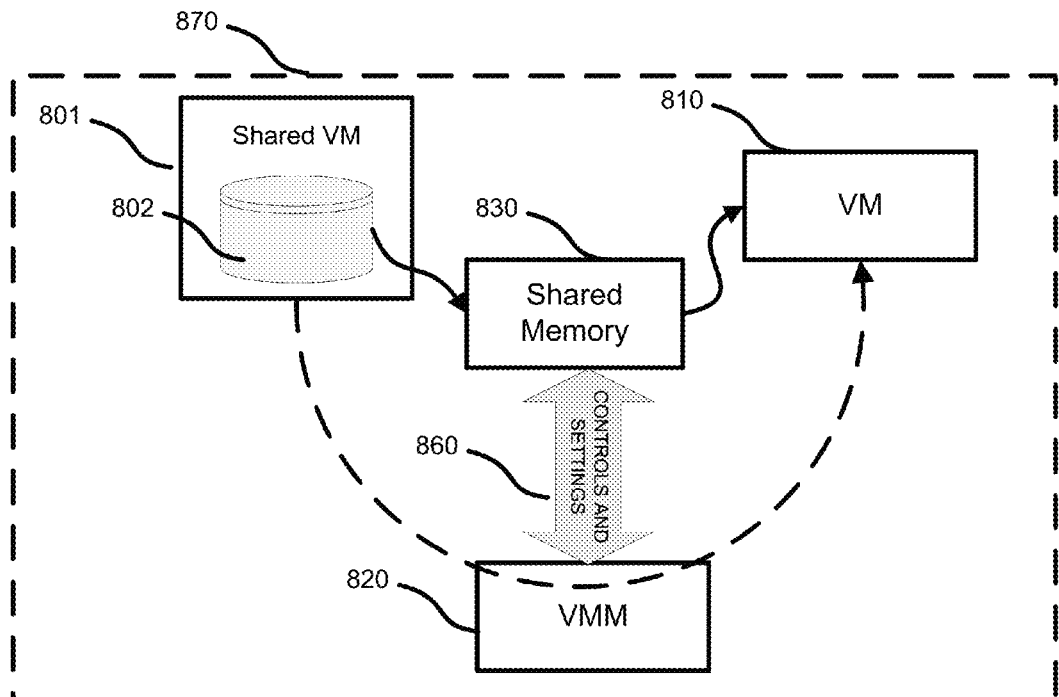

FIG. 8D shows an embodiment where shared data is accessed using a shared memory area 830 managed by, e.g., a VMM 820 or a Hypervisor (e.g. Xenbus or MS Veridian) by appropriate control actions and settings 860 required for sharing certain memory space and protecting it from corruption.

Furthermore, where the code, such as dynamic link libraries, etc., is loaded into memory, and is identical across different Virtual Machines, only a single copy needs to be maintained in physical memory (provided it is write-protected), and a redirect is used instead of the actual code. Note, however, that in some cases, the same guest OS code, when loaded into different locations in memory by different VMs, can sometimes be not entirely identical, and therefore, care needs to be taken in this regard. One example may be implemented as discussed above, because all DLL and driver images can combine places for local and global variables and code.

Additionally, a lightweight Virtual Machine can be implemented by removing some of the "dead weight" from the operating system. For example, in the case of modern versions of Windows™ Operating systems (such as Windows XP, Windows 2003 Server, Windows Vista, Windows 2000), instead of several gigabytes, the Virtual Machines guest OS footprint can be reduced to several hundred megabytes, by removing many of the (often unnecessary) drivers, removing temporary files, removing hiberfile.sys file, removing some rarely used user applications, such as Calculator, games, etc. Thus, such a "lightweight" guest OS (and the entire lightweight Virtual Machine) can be migrated and generally distributed much more easily on readily available media, such as flash drives, CD-ROMS, etc., and can be launched directly from the media.

Also, some embodiments of improving memory space usage are implemented in Parallels Software International, Inc.'s COMPRESSOR® tool for Virtual Machine guest OS disk drive allocation reduction.

Parallels® COMPRESSOR® is designed to perform the efficient reduction in VM disk space allocation, including the compacting of virtual disk drives, that can significantly increase the ratio of useful data in a Virtual Machine. The procedure consists of two steps:

(1) a preparatory step performed in the guest operating system (deleting temporary and unnecessary files, cleaning up of unused disk space);

(2) a shrinking/compacting step (reducing of the size of virtual disk) performed in the host (primary) operating system. This operation can be performed on different VMs and host OSs.

COMPRESSOR® can be installed in the host operating system and directly in Virtual Machine; it can be run in automatic mode and as a wizard An example of a shared file tree that can be used for this purpose is described in U.S. patent application Ser. No. 09/908,252, Filed: Jul. 18, 2001, entitled COMMON TEMPLATE FILE SYSTEM TREE, incorporated herein by reference in its entirety, as well as in U.S. patent application Ser. No. 11/378,268, filed on Mar. 20, 2006, entitled SYSTEM AND METHOD FOR DUPLICATION OF VIRTUAL PRIVATE SERVER FILES, incorporated herein by reference in its entirety—except in this case, the application is Virtual Machines, rather than virtual private servers.

A private area can be created exactly the same or similar as it is realized in Virtuozzo™ and those implementations may be used to start VMs. Available approaches are disclosed in U.S. patent application Ser. No. 09/908,252; filed Jul. 18, 2001, entitled COMMON TEMPLATE FILE SYSTEM TREE; U.S. patent application Ser. No. 10/691,066; filed Oct. 21, 2003; entitled SYSTEM AND METHOD FOR PROVIDING EFFECTIVE FILE-SHARING IN A COMPUTER SYSTEM TO ALLOW CONCURRENT MULTI-USER ACCESS and U.S. patent application Ser. No. 10/729,365; filed Aug. 12, 2003, entitled for SYSTEM, METHOD AND COMPUTER PROGRAM PRODUCT FOR MULTI-LEVEL FILE-SHARING BY CONCURRENT USERS, all of which are incorporated herein by reference in their entirety.

In another embodiment, a small dedicated boot-only partition may be used for starting VM, along with dedicated boot procedure. The partition may include partition dependent data only, such as MBR (master boot record), bootstrap files, etc. Then, using a dedicated boot procedure, other files may be taken from other VMs' areas or from the host system using links or other types of redirection, and content of this partition can be generated on-the-fly.

It should be noted that booting up of a Virtual Machine requires a minimal set of files and other data specified by the operating system architectures. These files and data should be stored preferably locally and in an ideal case only these files and links or stubs to shared data need to be present in the VM during startup.

The Windows XP Professional startup process the system and boot partitions must contain the following files: Ntldr (the operating system loader); Boot.ini (a file that specifies the paths to Windows XP Professional installations. For multiple-boot systems, Boot.ini contains the operating system choices that display on the startup menu); Ntdetect.com (the file that passes information about the hardware configuration to Ntldr); Ntoskrnl.exe (the core (also called the kernel) of the Windows XP Professional operating system. Code that runs as part of the kernel does so in a privileged processor mode and has direct access to system data and hardware); Hal.dll (the hardware abstraction layer (HAL) dynamic-link library file. The HAL abstracts low-level hardware details from the operating system and provides a common programming interface to devices of the same type (such as video adapters)); System registry file (the registry file that contains the data used to create the registry key HKEY_LOCAL_MACHINE\SYSTEM. This key contains information that the operating system requires to start devices and system services); Device drivers (driver files for hardware devices, such as keyboard, mouse, video, virtualization drivers).

For purposes of creating a lightweight image of a Virtual Machine, a lot of files that are resident on the computing system and are available over a network may be substituted in the VM image by links to shared object and in some embodiments by providing procedures of virtualization local access to data.

During creation of multiple similar VMs, shared files may be used in common area and be distributed as a single data set for the plurality of the VMs.

In one embodiment, VM image or partition required for VM startup (VM partition) should contain only unique files related to that VM, e.g., user data and settings can be distributed as a part of VM partition. In another embodiment, data which is not strictly required for start of the VM can be distributed as a separate set of data, e.g., as a collection of templates. In other embodiments, before creation of VM partition data on the computing system may be checked for excluding the sets of data already presented on the computing system and excluding such a data from being distributed.

In another embodiment, data that is obviously unique as well as data required locally for starting the VM can be distributed for use on the local computing system and other data can be initially searched for, and then shared on the local computing system. If some required data is absent on the local computing system, the data may be downloaded via the network or may be accessed via a network as local data. Some of approaches that may be partially be utilized in the present invention are known from the art, e.g., network boot up industry standards including Wired for Management (WfM), PXE, DHCP, BOOTP, TFTP and NCP/IPX.

In another embodiment the minimal set of data required for VM startup and configuration may be distributed to minimize VM partition sizes. As is known in the art, Power-on self test (POST) phase; Initial startup phase; Boot loader phase; and Detect and configure hardware phase can be implemented using locally stored data, discussed above. So a bootable VM partition for starting VM and VM supporting means (e.g., a VMM or Hypervisor) on the computing system can contain initial boot up data, as well as hardware detection means and drivers required for access to shared data. The shared data may be preferably stored locally on the computing system and may be accessed via local network, via VMM communication means or via a public network, such as the Internet. As an example, the minimal set of data can contain boot sectors and an operating system loader. The data needs to be placed using predefined absolute addresses on the storage device or device partition. The storage device may be hard disk drive or commercial analogs, such as flash drives, optical drives and so on. Further, additional files may be added to minimal set of data such as basic OS files, disk driver, operating system driver, other data may be requested the using access to host data or connection to distant servers.

One implementation of similar technology that may be used in the present invention is disclosed in U.S. patent application Ser. No. 11/022,887, filed Dec. 28, 2004, entitled SYSTEM AND METHOD FOR RAPID RESTORATION OF SERVER FROM BACKUP, incorporated herein by reference in its entirety.

A Virtual Machine can therefore be started from a partition, or a similar construct using, e.g., Acronis True Image from Acronis, Inc., SWsoft, Inc.'s VZFS usage, etc. Note that in the case of a Virtual Machine migration, it is much easier to migrate a Virtual Machine where most of the files have been replaced by links, and only a boot loader needs to be regenerated.

Note also that the files of the different Virtual Machines, where a shared file tree structure is used, can have the same mounting point, see discussion in U.S. patent application Ser. No. 10/691,066, filed on Oct. 21, 2003, entitled SYSTEM AND METHOD FOR PROVIDING EFFECTIVE FILE-SHARING IN A COMPUTER SYSTEM TO ALLOW CONCURRENT MULTI-USER ACCESS, incorporated herein by reference in its entirety.

The present approach therefore takes advantage of the fact that most of the Virtual Machine files are common (and often identical) for many (if not all) the Virtual Machines running on a particular physical computer. That is, on a physical computer or hardware server running several Virtual Machines, each Virtual Machine has several thousand files in its "private" area. Most of these files are identical across the Virtual Machines, and often across Virtual Machines and the host OS. Although occasionally a situation might arise where an administrator of that particular Virtual Machine might want to modify the Virtual Machine files, this is a relatively rare situation. It is somewhat analogous to the ability of a user of a desktop to modify the files of the operating system running on that desktop—for example, Windows™, LINUX, etc. Although the desktop user has that ability, very few people, in fact, take advantage of it. Similarly, in the context of the Virtual Machine, each Virtual Machines administrator has the ability to change the files (including all the files) of that Virtual Machine, but very rarely does so. This also applies to sets of networked hardware boxes with VMs, e.g., in a corporate data center where a lot of similar files may exist on different VMs. Thus, the invention can give advantages when used with multiple VMs running on remote hardware systems, which can refer to files from VMs on remote servers.

Most Virtual Machines are launched in order to run some application, for example, non-native user applications, a web-server, a game server, etc. Thus, to the extent that files are modified (if any), they are user data files (i.e., particular application files), and not "Virtual Machine" files (or guest OS files) per se.

Accordingly, in view of the above empirical observation, it is unnecessary for each Virtual Machine to have its own physical copy of each file. In other words, it is unnecessary for each Virtual Machines disk partition (real or virtual) to contain all the contents of all the Virtual Machine files—the vast majority of these Virtual Machine files are identical, and only a single copy needs to be maintained somewhere. Rather than having a copy of the actual files in the Virtual Machines' private file areas, these files can be replaced with links or stubs to a template, or shared, area. The template area will contain the "master," or unaltered, files, with the links in each Virtual Machines pointing to those "master" files. For further file modification, "Copy-on-Write" technology may be used.

The present invention therefore enables a dramatic reduction in the amount of disk space that needs to be allocated to each Virtual Machine. Since for the vast majority of the Virtual Machines, most files will be in common and identical across the Virtual Machines, only a single shared template area containing a single "master" copy of the Virtual Machine files needs to be maintained, freeing up the disk space and RAM otherwise allocated to the Virtual Machines' own administrative needs for user applications.

Accordingly, a system and method is contemplated for replacing identical files in each Virtual Machines private area with links to a "master" (template, or shared) area containing a "master" copy of the files. The software to perform this task can be treated as a system utility. This process can be performed with respect to Virtual Machines that have already been launched, or it can be performed prior to the launching of the Virtual Machine, at the time of the Virtual Machine creation, where the files are replaced with the appropriate links prior to the startup of the Virtual Machine.

A VM with the characteristics described above (i.e., with a guest OS whose files are replaced by links to a master template) can be started from scratch. Alternatively, a running or existing VM can be subject to having its files replaced by links using a system utility. One embodiment of the invention may use links or stubs, as described in the patent applications listed above, for elimination of unnecessary files from the very beginning of VM instantiation procedure. For example, deployment of a VM with a certain operating system can be accomplished by searching already installed Operating System structures in a particular already-existing VM, or in a host OS or in a remote VM on a remote computing system. Deployment of such structures may be then substituted by mechanisms for accessing those structures (e.g., files) from the deployed VM.

U.S. patent application Ser. No. 11/264,100, filed on Nov. 2, 200, entitled SYSTEM AND METHOD FOR PRE-INSTALLING OF VIRTUAL PRIVATE SERVER FILES further discloses creating virtual environments using specially shared areas of server resources for creating initial structures that characterize the virtual environment workspace. Such an approach can be used while realization of some embodiments of the invention except creation of specifically shared areas created before virtual environment installation.

The same operation may be performed in the process of creating snapshot or another type of image of a VM intended to be deployed on a different hardware system, e.g., while preparing a user requested VM with software means required to user. These can include applications preinstalled and/or preconfigured in a certain operating system for testing or demonstration purposes. Such a VM or execution environment may contain structures common for the user system, where VM will be deployed and for the system where the applications were installed and configured. Therefore, the image may be reduced in size by excluding common structures. In this case, the structures that already exist on user hardware system may be excluded from the process of packing the VM to the image and replaced by mechanisms for accessing those structures. In some cases, this can greatly improve memory or network traffic usage. In one embodiment, a hardware (disk) OS driver or boot area of a small partition required for VM to start may be used.

Figure 2A:
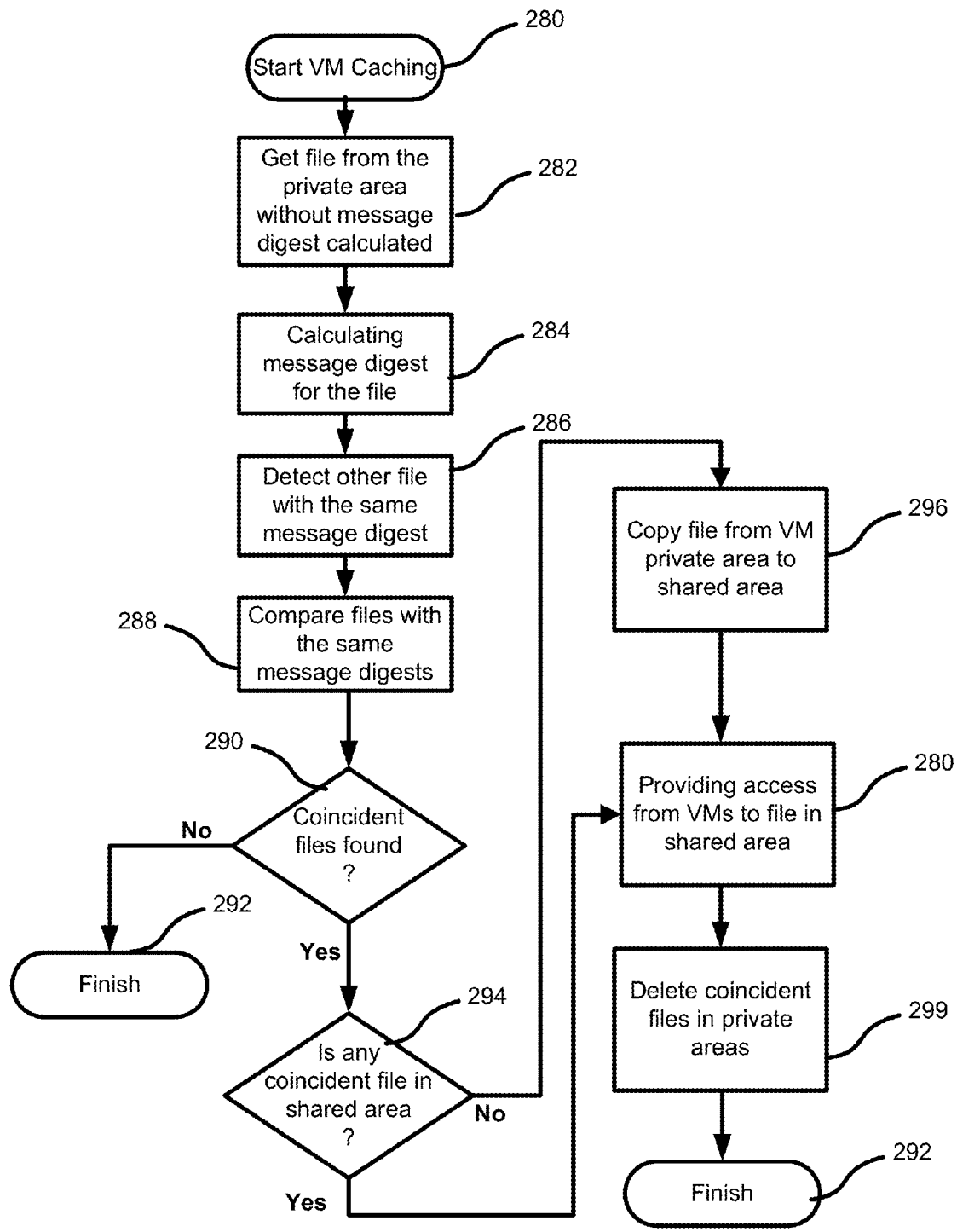
FIGS. 2A-2D illustrates embodiments of disk space memory reallocation.

FIG. 2A illustrates one aspect of the utility's operation that reflects reduction of memory space required for supporting already existing VMs. As shown in FIG. 2A, when the Virtual Machine caching process starts in step 280, the utility gets the file from a private area of the Virtual Machine without a previously calculated message digest (step 282). A number of methods can be used to verify the identity of the files being replaced to the master copy of the file. One method is comparing checksums. Another method is bitwise comparison of file contents.

Another method involves calculating hash function values of the files, and then comparing files with identical hashes. An algorithm is used to transform a string of bits into a usually shorter value of a fixed length or a key that represents the original value. This is called the hash value. Hash functions are employed in symmetric and asymmetric encryption systems and are used to calculate a fingerprint/imprint of a message or document. When hashing a file, the file is converted into a short bit string—a hash value—and it impossible to recover the original file from the hash value. A hash value is unique in the sense that two different files cannot result in the same bit string (or, at a minimum, the probability of this occurring is extremely low).

The "message digest," as used in this context, is a concept known in cryptography. The message digest is usually some small identifier related to the file, such as a hash function value, an electronic signature, a checksum, etc. The important point is that the message digest is unique for each file with unique contents, and, files with different contents cannot have the same message digest.

The message digest is then calculated (step 284), and the utility then identifies other files that have the same message digest (step 286). By definition, files that have the same message digest have identical contents. The utility then compares files with the same message digest (step 288). If no such files have been found (step 290), the process terminates in step 292. If such files have been found, then, in step 294, the utility checks whether there are any coincident files in the shared area. If not, then the file is copied from the Virtual Machines private area to the shared area (step 296). The copying process can be preferably implemented as copying file to another partition, e.g., to a special shared partition, or by preserving physical blocks of the file in the same location, but using links or pointers for accessing file in the Virtual Machine, where the file was previously accessed directly. Indeed, in the latter case, the file should be copied to the local area of the Virtual Machine when that Virtual Machine tries to modify the file. The Virtual Machine is then given access to that file through a link or a pointer (step 298). In step 294, if the file is already in the shared area, then step 296 need not be performed.

The utility can then delete the file in the Virtual Machine's private area (step 299), and the process terminates (step 292).

Figure 2B:
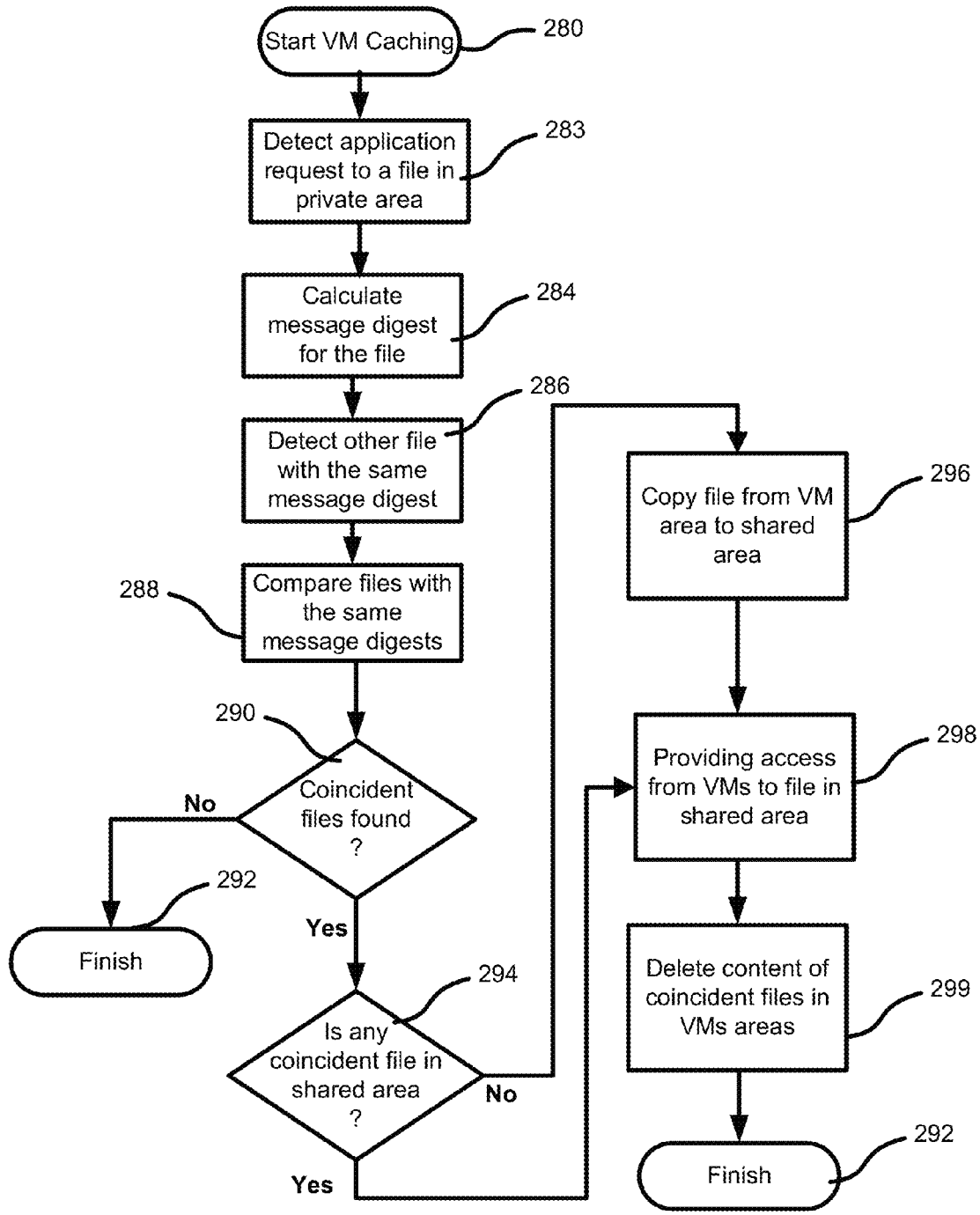

FIG. 2B illustrates another embodiment of the invention. As shown in FIG. 2B, the process of Virtual Machine caching starts in step 280. An application request to access or request a file from a private area is then detected in step 283. In step 284, a message digest for the file is calculated.

In step 286, other files that have the same message digest are identified. The files are then compared in step 288. Note that the digest is shorter than the original, and depending on which algorithm is used to calculate the digest, there is a possibility that different original files can have the same digest. In step 290, if no coincident files are found, the process terminates in step 292. If coincident files (i.e., files with the same message digests) are found, the utility checks whether such a file also exists in the shared area. (Step 294). If no such file exists, then, in step 296, the file is copied from the Virtual Machine's private area to the shared area. The Virtual Machine is then provided access to that file in the shared area, through a link or a pointer (step 298).

In step 294, if the file with the same message digest is found in the shared area, then the process proceeds directly to step 298. In step 299, the coincident files in the private areas of the Virtual Machine can be deleted, and the process terminates in step 292.

Figure 2C:
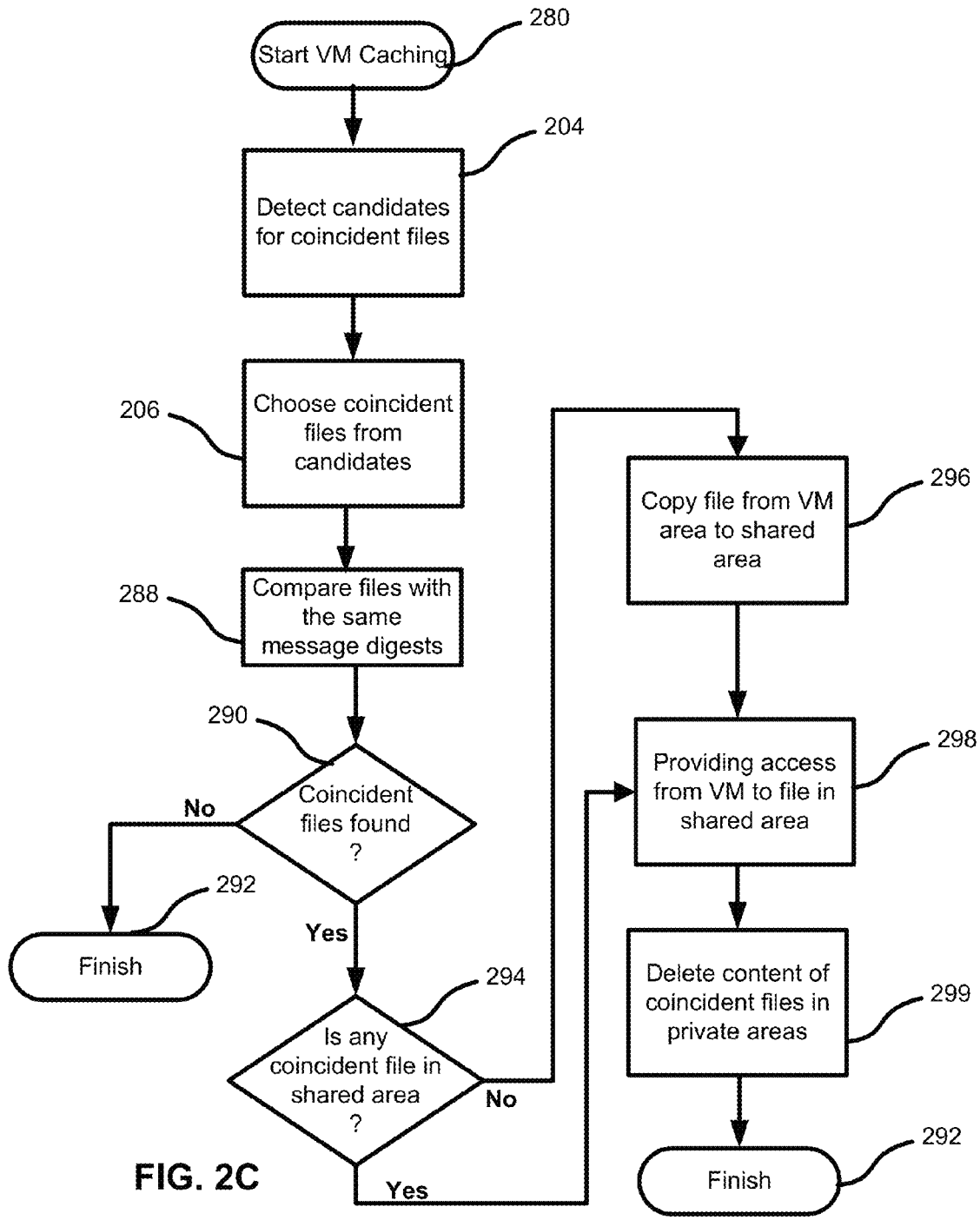
Figure 2D:
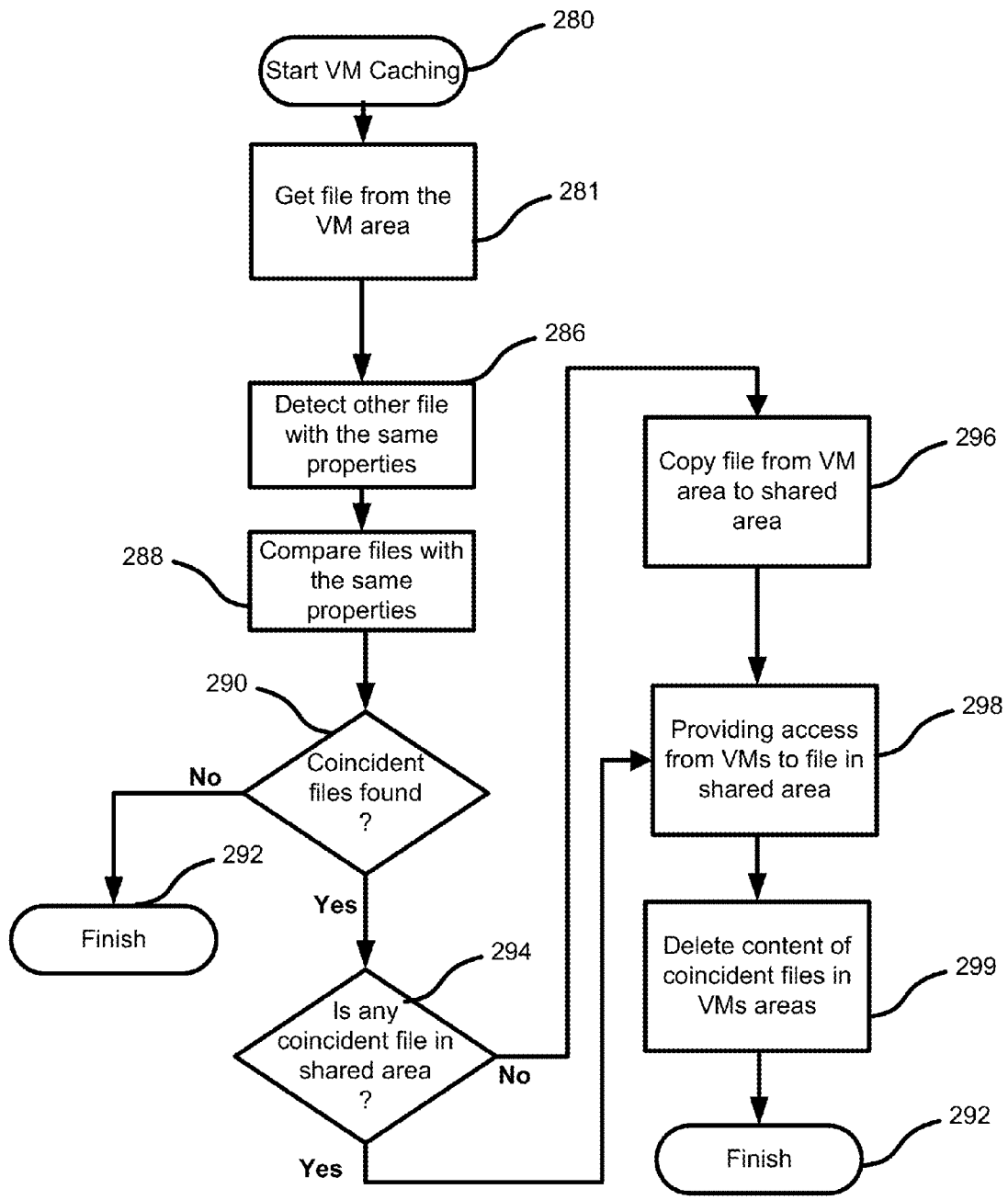

FIG. 2D illustrates another possible aspect of the utility's operation. As shown in FIG. 2D, when the Virtual Machine caching process starts in step 280, the utility detects files that are candidates for being placed in the shared area (step 204). For example, template files and files that are user-specific are usually not candidates, while operating system files, drivers, etc. usually are. A set of files is then chosen (selected) (step 206).

The utility then compares the files based on their message digests (step 288), and, if no such files exist, the process terminates in step 292. If such files have been found, then, in step 294, the utility checks whether there are any coincident files in the shared area. If not, then the file is copied from the Virtual Machines private area to the shared area (step 296). The Virtual Machine is then given access to that file through a link or a pointer (step 298). In step 294, if the file is already in the shared area, then step 296 need not be performed.

The utility can then delete the file in the Virtual Machines private area (step 299), and the process terminates (step 292). Note that in FIG. 2C, instead of having the Yes/No branches from step 294, a command line defined by a user can specify which type of checking can be performed. For example, the user can check for common files, or can create new shared files, or can manually check for files that already exist in the shared area.

FIG. 2C illustrates another aspect of the utility's operation. As shown in FIG. 2C, when the Virtual Machine caching process starts in step 280, the utility gets the file from a private area of the Virtual Machine without a previously calculated message digest (step 281). The utility then identifies other files that have the same message digest (step 286). The utility then compares files with the same message digest (step 288). If no such files have been found (step 290), the process terminates in step 292. If such files have been found, then, in step 294, the utility checks whether there are any coincident files in the shared area. If not, then the file is copied from the Virtual Machines private area to the shared area (step 296). The copying process can be preferably implemented as copying file to another partition, e.g., to a special shared partition, or by preserving physical blocks of the file in the same location, but using links or pointers for accessing file in the Virtual Machine, where the file was previously accessed directly. Indeed, in the latter case, the file should be copied to the local area of the Virtual Machine when that Virtual Machine tries to modify the file. The Virtual Machine is then given access to that file through a link or a pointer (step 298). In step 294, if the file is already in the shared area, then step 296 need not be performed.

The utility can then delete the file in the Virtual Machine's private area (step 299), and the process terminates (step 292).

Figure 3:
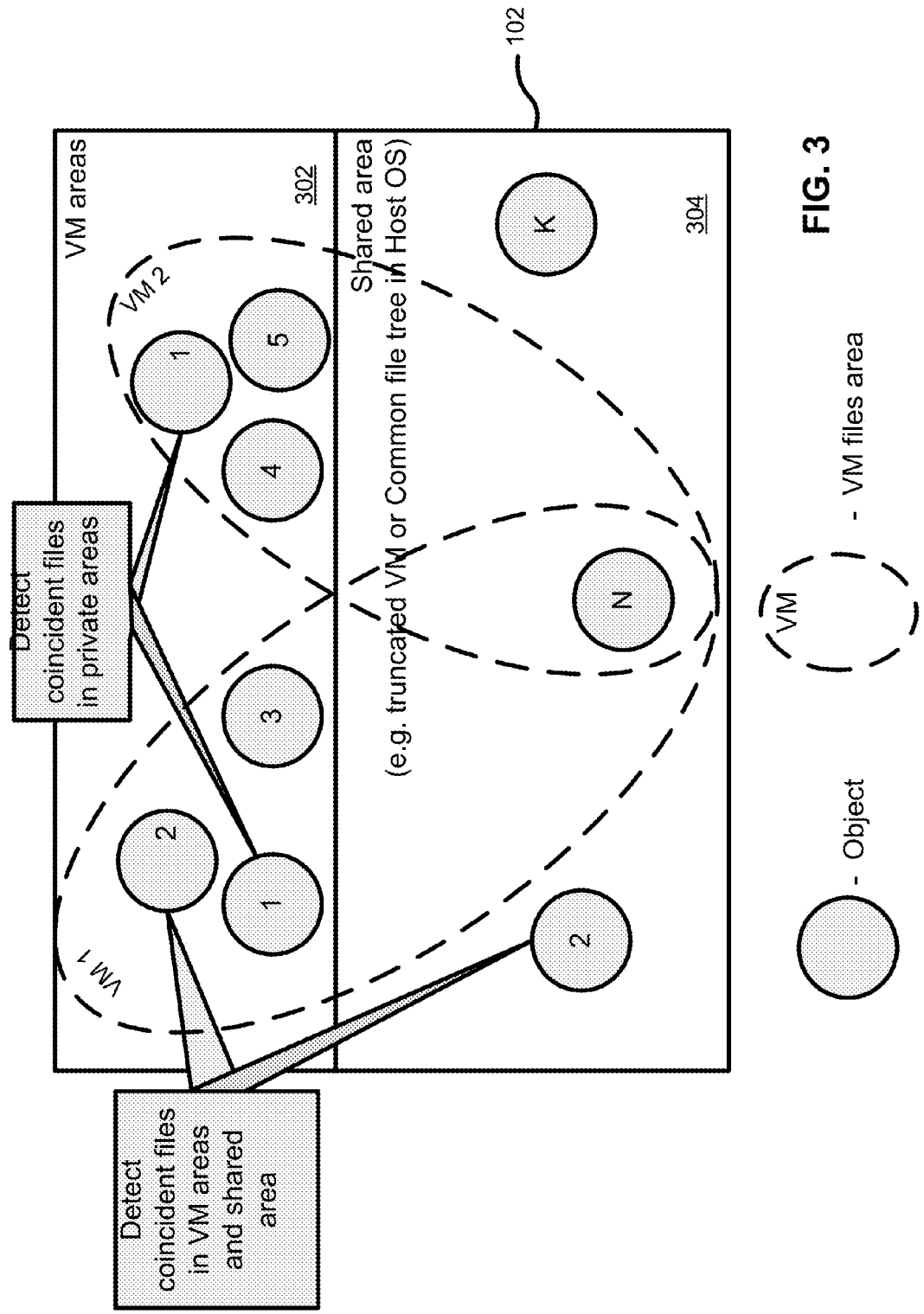
FIGS. 3-5 illustrate various states of two Virtual Machines during implementation of the invention.

FIG. 3 illustrates, in block diagram form, the relationship of the various entities involved in the operation of the utility. As shown in FIG. 3, the utility typically works with objects. These objects may be files, directories, or other named objects that the Virtual Machines themselves work with. The most common case is for the object at issue to be a file or files.

Further, as shown in FIG. 3, the computer 20 has private areas 302 corresponding to the particular Virtual Machines, and a shared area 304. The numbered circles in the figure represent files, where, for example, file number 1 is identical between Virtual Machine1 and Virtual Machine2. File number 2 is found only in the private area of Virtual Machine1 and a copy already exists in the shared area 304. File K exists in the shared area but is not used by either of the two Virtual Machines. File N is already in the shared area 304 and is already shared by both Virtual Machines 1 and 2, through pointers that point to that file.

Figure 4:
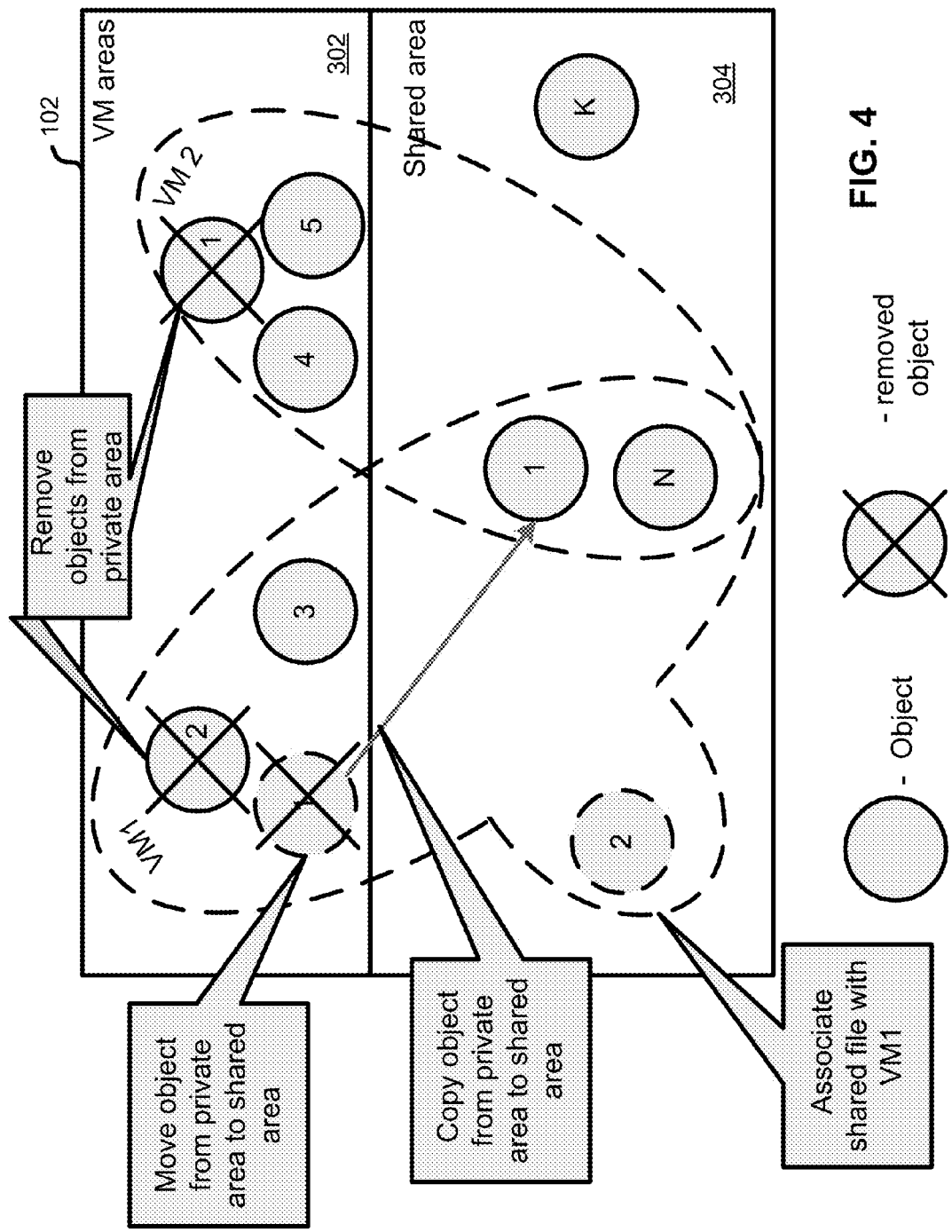

FIG. 4 illustrates the next stage in the operation of the utility. Note that file 1 has been copied to the shared area 304, and deleted from the private areas of the Virtual Machines. File 2 has been deleted from the private area of Virtual Machine one, since it exists already in the shared area, 304, and Virtual Machine1 has been granted access to file 2 in the shared area.

Figure 5:
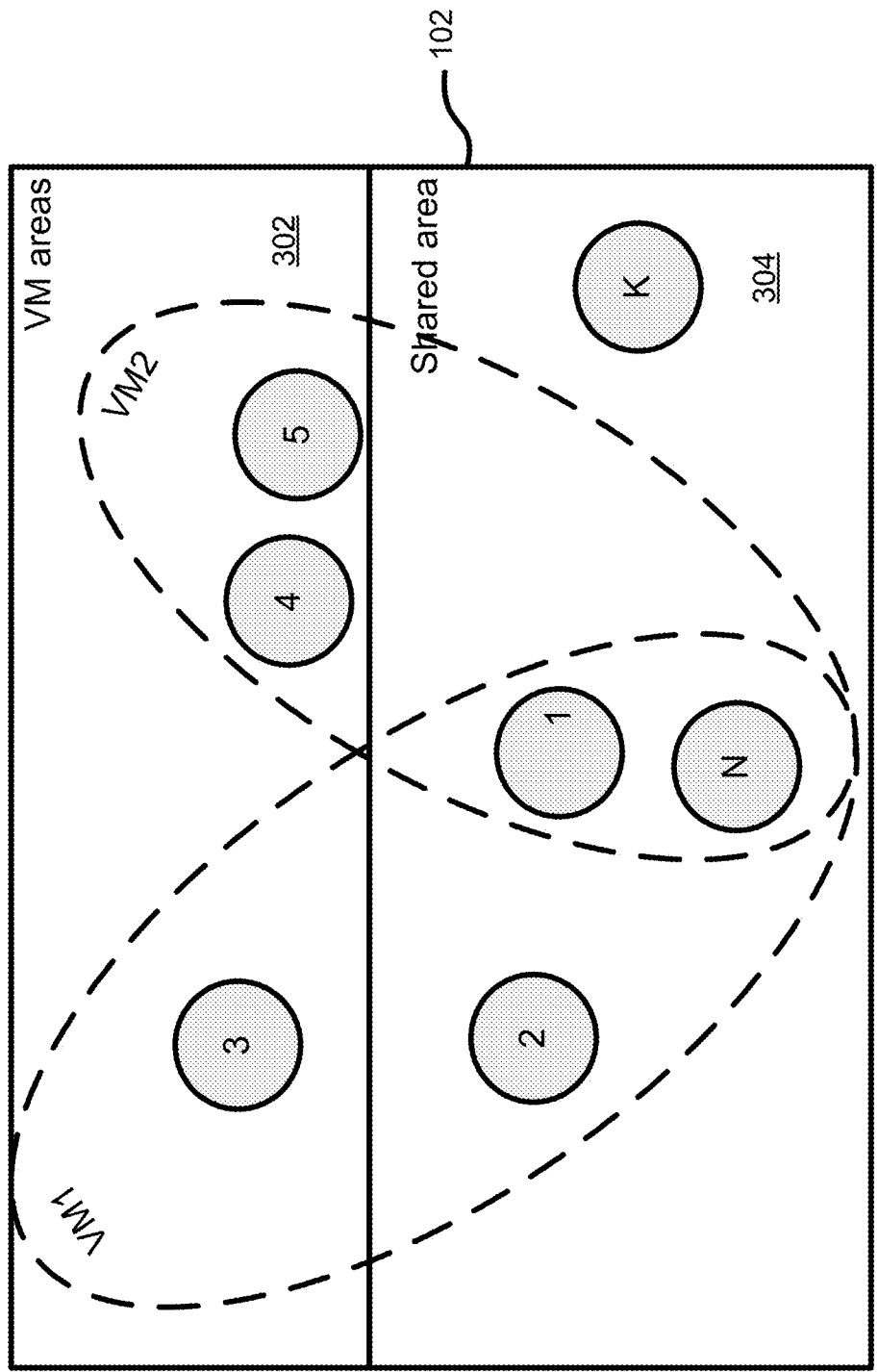

FIG. 5 illustrates the state of the system after all the operations have been performed. Note that file 1 is now shared by both Virtual Machines, file 2 is only accessed by Virtual Machine1. Files 3, 4 and 5 remain in the private areas 302. This may be, for example, due to the fact that these files are either user specific, or may be system files that have been changed or edited in some manner by the Virtual Machine itself, and are therefore not good candidates for being shared. Note also that whatever memory or disk space was previously occupied by files 1 and 2 in the private areas of the Virtual Machines, that disk space is no longer taken up by them.

Figure 6:
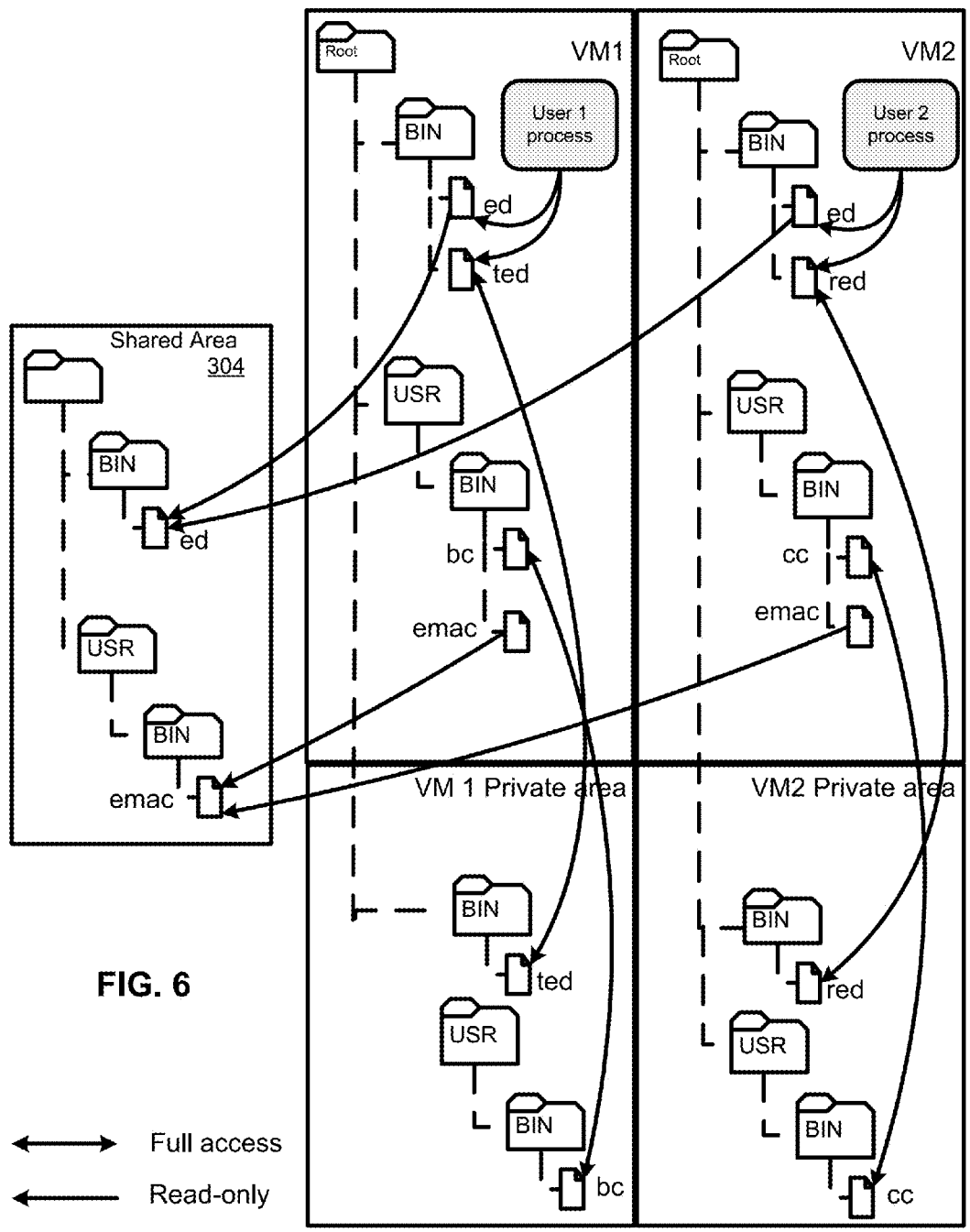
FIG. 6 is a diagram showing how links are used to access shared files.

FIG. 6 illustrates the operation of the utility from a directory perspective. As shown in FIG. 6, the shared area 304 includes a directory. Also, each Virtual Machine includes a directory for the common area, and a directory for that Virtual Machine's private area. The links (arrows in the figure) represent pointers to the files on the disk or other storage media. For example, as shown in this figure, a user 1 process accesses file ed and file ted. These files, in fact, are physically located in the shared area, and all that is located in the Virtual Machines directory and memory are pointers. Similarly, user 2 process in Virtual Machine 2 accesses the file ed in that Virtual Machines directory, but that file is also linked to the file ed in the shared area 304. Thus, multiple Virtual Machines can access a single file, and memory usage can be reduced.

In one embodiment, hash functions are calculated while the user applications attempt to access or modify the file. Alternatively, all files without hashing are periodically checked and hash functions for files in private area are periodically formed.

The process of replacing a file with a link needs to check whether that file is being used at the moment (if it is, that could mean that the user of that Virtual Machine is attempting to modify it). Note also that the process of replacing identical files with links to a master copy can be done as a background process.

Note also that the approached described herein can also be applied to a situation where there exists a finite number of versions of "the same" file. For example, some Virtual Machines might have a security patch installed already, and others might not. In this case, there can be two different versions of the same file (or, more likely, two different versions of a group of files that is subject to the security patch).

Thus, it is possible to have more than one version of the same file in the master template area, with the link in the Virtual Machines private area pointing to the appropriate file, depending on whether it has been patched, or upgraded (or not).

With regard to the upgrades, it is possible that some users of "the same" application, such as a game, might have upgraded to a new version, and others have not. This may be due either to inattention, inertia, cost considerations, etc. In this case, similarly, the links in the Virtual Machines private areas can point to one of several files that represent the "correct" file for that particular Virtual Machine.

Note also that similar to having only a single copy of the file on the disk drive, the same concept applies to random access memory (which is frequently the more expensive component in many server Virtual Machine applications). Just as only a single copy of identical files needs to be kept in a master template area (with the other copies replaced by links), similarly, each Virtual Machines is allocated a portion of random access memory, with many of its files that are necessary for execution loaded into memory. Thus, instead of the files, the memory can be loaded with pointers (analogous to links) to one master copy of the file that is loaded into some protected area of memory.

It should also be noted that the present approach is compatible with reducing user application file space as well, to the extent that many of the launched Virtual Machines on the same computer share the same user application files. This is frequently the case in such applications as online multi-player games, where a single Virtual Machine may be limited to a particular number of players (for example, for bandwidth reasons, server load reasons, or due to any other reason).

However, many such Virtual Machines could be running on the same physical machine, each Virtual Machine dedicated to servicing some subset of the players, but each Virtual Machine running the same game. Note that in the context of games (and many other applications), the vast majority of the files are not used at any given time, and almost never modified—for example, system utilities, drivers, image and video files used to generate a game environment, etc. This provides similar opportunities for creating a single "master" template area, where only one copy of the file needs to be stored, and links to that copy provided in the Virtual Machines private disk area. Obviously, if a user, or a Virtual Machine administrator, decides to change or modify a particular file in some fashion, then a copy of that modified file would be created in the Virtual Machine's private area, and the link can point to that modified copy, rather than to the master copy.

It should be noted that the paging file is one of the largest files that is maintained by the guest operation system (or often any operating system). In the Microsoft Windows operating system, the paging file, which is used to swap pages in and out of random access memory, is usually allocated about 100-150% of physical RAM or typically 1-6 gigabytes. Initially, the entire paging file is empty, and gradually, over time, it fills up somewhat, however, it is rarely entirely full. Furthermore, when execution of a Virtual Machine is interrupted, for example, for the purpose of storing an image of the Virtual Machine (or saving the entire VM context), all the data in the paging file becomes meaningless. However, upon restarting of the Virtual Machine, the paging file is again reallocated, at the same two gigabyte size. As one option, therefore, the paging file, upon creation, could be replaced by a redirection link to the paging file of the host operating system. Copy-on-write can then be used to ensure that conflicts do not arise between the Virtual Machines attempt to read and write to the host operating systems paging file, and attempts by the host OS or by other Virtual Machines to write to the same paging file.

In the case of the hibernation file, this file may not be needed at all, since different technology can be used in the case of Virtual Machines, to achieve the same result, such as snapshots and hibernation implemented outside of the guest OS by the underlying VMM, not by the guest OS itself. Similarly, temporary files and/or temporary files folder can also be replaced by a redirection to the host OS temporary files folder.

The Virtual Machine Monitor, or the Hypervisor, or both can be responsible for handling the redirect and/or the copy-on-write process, regarding the paging files and/or temporary files and/or temporary file folders of the Virtual Machines and the host operating system. When a particular Virtual Machine's execution is stopped, the VMM and/or the Hypervisor can then ensure that the relevant pages are saved in an appropriate file.

Note that one example of a product that performs the functions described herein, such as the leading unnecessary files, paging files, hibernation files, temporary files, etc. is the COMPRESSOR® product, available from Parallels Software International, Inc., the assignee of this application. As yet a further example, a Virtual Machine image can be stored on a read-only medium, such as a CD-ROM or write-protected flash drive. In this case, all the changes made to the state of the VM—writes to the paging file, writes to temp files, writes to the file system—would be written to and stored on the storage residing on the server. After the Virtual machine is stopped these changes can be discarded, leaving the VM in exactly the same state as it was before it was started (e.g., useful for demonstrations) or saved back to the original image (e.g., if stored on a flash drive) if necessary (for example, for updating the software inside VM image).

As another example, if a user decides to move from Windows XP™ to Vista, he can take the XP machine, capture it in a Parallels VM and move it to the new Vista machine. Thanks to file-level copy-paste, drag-n-drop, single file type assoc, etc. which are possible using Coherence™ (available from Parallels Software International, Inc.), this is a fairly seamless process for instance, the user can stop using his Outlook Express as his e-mail client and move to Vista's Windows Mail by migrating the VM, it moves the mail and address book to Vista and switches the default e-mail client and address book to Vista. The list of those assisted cross-environment migrations includes mail client address book, calendar, app newsgroup client, internet/phone calling, media player (need to migrate a media database) browser favorites, cookies, history, security and other settings. Some of the migration can be done automatically (or prompted/scripted) during the initial migration of the old OS into a VM on the new system.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:
1. A method for managing files of Virtual Machines (VMs), the method comprising:
 launching a plurality of Virtual Machines in a computing system having a host operating system (OS) running on a hardware processor;

based on knowledge of which file in the VM and in the host OS is owned by which component, identifying identical files in multiple guest OSes in the Virtual Machines and in the host OS;

using a content of at least one file of the identical files of the host OS as a shared file;

using a re-direct, providing access to the shared file when any Virtual Machine attempts to access its private file; and using copy-on-write, making a copy of the shared file if the Virtual Machine attempts to modify the shared file, and placing a copy of the shared file in a private area of the corresponding Virtual Machine, wherein files of one of the Virtual Machines are used as a master template, and the master template includes the at least one file of the host OS to which attempts to access a corresponding shared file by other Virtual Machines are redirected.

2. The method of claim 1, wherein providing access to the copy of the shared file in the shared space uses an Application Process Interface (API) redirection.

3. The method of claim 2, wherein the API redirection is performed on a file basis.

4. The method of claim 2, wherein the API redirection is performed on a block basis.

5. The method of claim 1, wherein the launching is performed from a VM image that does not include an OS distributive.

6. The method of claim 1, wherein the launching is performed from a boot-only disk partition.

7. The method of claim 6, wherein the master template is located in a separate storage area of a disk from an area of the disk where an image of the VM is stored.

8. The method of claim 6, wherein boot data of the VM is located at a predefined absolute address.

9. The method of claim 1, wherein the Virtual Machines are launched with full featured guest OSes, and footprints of the guest OSes is then reduced by eliminating unnecessary files and replacing at least some remaining files with redirection links.

10. The method of claim 9, wherein the remaining files are identified by comparing guest OS files with host OS files.

11. The method of claim 9, wherein the remaining files are identified by comparing guest OS directories with host OS directories.

12. The method of claim 9, wherein the unnecessary files are identified based on belonging to a same OS and a same version of the OS.

13. The method of claim 12, wherein the version of the OS in the VM is identified by parsing a boot sector of a virtual disk of the VM.

14. The method of claim 1, further comprising overlapping linear memory address spaces of at least two Virtual Machines.

15. The method of claim 1, wherein the guest OS of the Virtual Machines does not contain standard games supplied with the OS.

16. The method of claim 1, wherein a temporary files folder of the Virtual Machine is redirected to a temporary files folder of the OS.

17. The method of claim 1, wherein a hiberfile.sys file is removed from an image from which the VMs are launched.

18. The method of claim 1, wherein driver files of the Virtual Machines are removed from an image of the VM from which the VMs are launched, and redirects to host OS drivers are added to the VMs.

19. The method of claim 1, wherein virtual disk drives of the Virtual Machines are compacted.

20. The method of claim 1, wherein the master template also includes shareable user application files to which access attempts to access the file by other Virtual Machines are redirected.

21. The method of claim 1, wherein providing access to the copy of the shared file in the shared space uses at least one of:
(a) network access to a file system in a shared area;
(b) file redirection using a cluster file system and direct access to emulated raw disk partition that is created as a file or disk)
(c) redirection using shared bus access initiated via Virtual Machine Monitor (VMM) or Hypervisor;
(d) shared memory area; and
(e) network transport using at least one of Transmission Control Protocol (TCP), User Datagram Protocol (UDP), Named Pipe, Local Unix Domain Sockets, Server Message Block (SMB) redirection and Network File System (NFS).

22. The method of claim 1, wherein access to the shared file from the Virtual Machine is implemented using stub files.

23. A computer useable non-transitory storage medium having computer executable program logic stored thereon for executing on a processor, the program logic implementing the steps of:

launching a plurality of Virtual Machines in a computing system having a host operating system (OS) running on a hardware processor;

based on knowledge of which file in the VM and in the host OS is owned by which component, identifying identical files in multiple guest OSes in the Virtual Machines and in the host OS;

using a content of at least one file of the identical files of the host OS as a shared file;

using a re-direct, providing access to the shared file when any Virtual Machine attempts to access its private file; and using copy-on-write, making a copy of the shared file if the Virtual Machine attempts to modify the shared file, and placing a copy of the shared file in a private area of the corresponding Virtual Machine, wherein files of one of the Virtual Machines are used as a master template, and the master template includes the at least one file of the host OS to which attempts to access a corresponding shared file by other Virtual Machines are redirected.

24. A system for migrating an execution environment to a new platform hardware or a new virtual platform, the system comprising:
a processor;
a memory; and
a computer code loaded into the memory and executed on the processor for implementing the steps of:

launching a plurality of Virtual Machines in a computing system having a host operating system (OS) running on a hardware processor;

based on knowledge of which file in the VM and in the host OS is owned by which component, identifying identical files in multiple guest OSes in the Virtual Machines and in the host OS;

using a content of at least one file of the identical files of the host OS as a shared file;

using a re-direct, providing access to the shared file when any Virtual Machine attempts to access its private file; and using copy-on-write, making a copy of the shared file if the Virtual Machine attempts to modify the shared file, and placing a copy of the shared file in a private area of the corresponding Virtual Machine, wherein files of one of the Virtual Machines are used as a master template, and the master template includes the at least one file of the host OS to which attempts to access a corresponding shared file by other Virtual Machines are redirected.

25. A system for managing files of Virtual Machines, the system comprising:

an operating system running on a hardware processor in operating system space;

a plurality of Virtual Machines running in user space;

a master copy of at least some files of least one Virtual Machine maintained by the operating system, wherein the at least some files have been flagged as identical files in multiple guest OSes in the Virtual Machines and in the host OS based on knowledge of which file in the VM and in the host OS is owned by which component; and a software component running in operating system space that compares contents of the files of the Virtual Machines to the master copy, and for those files that have the same contents, replaces the files of the Virtual Machine with links to the master copy files, wherein the master template includes user application files and host OS files such that attempts to access a corresponding shared file by other Virtual Machines are redirected to the master template.

\* \* \* \* \*